United States Patent [19]

Shaikh et al.

[11] Patent Number: 5,397,830
[45] Date of Patent: Mar. 14, 1995

[54] DIELECTRIC MATERIALS

[75] Inventors: Aziz S. Shaikh, Ventura, Calif.;
Gordon J. Roberts, Parma, Ohio;
Gautam Sarkar, Santa Barbara, Calif.

[73] Assignee: Ferro Corporation, Cleveland, Ohio

[21] Appl. No.: 186,199

[22] Filed: Jan. 24, 1994

[51] Int. Cl.6 .......................... C08K 3/40; C03C 3/04;
C03C 3/07; C03C 3/083

[52] U.S. Cl. ................................ 524/494; 524/430;
501/4; 501/11; 501/68; 501/69; 501/74

[58] Field of Search ................. 524/494, 430–433;
501/4, 68, 69, 74, 11

[56] References Cited

U.S. PATENT DOCUMENTS

| | | | |
|---|---|---|---|
| 3,656,984 | 4/1972 | Hoffman | 106/53 |
| 3,785,837 | 1/1974 | Amin | 106/52 |
| 3,787,219 | 1/1974 | Amin | 106/73.3 |
| 3,816,172 | 6/1974 | Hoffman | 117/212 |
| 3,837,869 | 9/1974 | Bacher et al. | 106/53 |
| 3,848,079 | 11/1974 | Amin | 174/68.5 |
| 3,939,295 | 2/1976 | Robertson et al. | 428/539 |
| 4,239,519 | 12/1980 | Beall et al. | 501/4 |
| 4,392,180 | 7/1983 | Nair | 361/321 |
| 4,609,582 | 9/1986 | Joormann et al. | 428/138 |
| 4,618,590 | 10/1986 | Baudry | 501/17 |
| 4,624,934 | 11/1986 | Kokubu et al. | 501/17 |
| 4,808,673 | 2/1989 | Hang et al. | 524/413 |
| 4,820,661 | 4/1989 | Nair | 501/79 |
| 4,830,988 | 5/1989 | Hang et al. | 501/21 |
| 4,948,759 | 8/1990 | Nair | 501/17 |
| 4,959,330 | 9/1990 | Donohue et al. | 501/8 |
| 4,985,376 | 1/1991 | Sunahara et al. | 501/22 |
| 5,071,794 | 12/1991 | Shaikh | 501/17 |
| 5,089,172 | 2/1992 | Allison et al. | 252/512 |
| 5,165,986 | 11/1992 | Gardner et al. | 428/209 |
| 5,298,330 | 3/1994 | Stadnicar, Jr. et al. | 428/432 |

Primary Examiner—Tae H. Yoon
Attorney, Agent, or Firm—Rankin, Hudak & Hill

[57] ABSTRACT

The present invention provides new and improved dielectric materials. In one preferred embodiment such novel dielectric material is formed by firing a composition including a glass composition comprising in weight percent from about 22% to about 45% ZnO, from about 4% to about 22% MgO, from about 1% to about 16% $Al_2O_3$, from about 20% to about 49% $SiO_2$, from about 2% to about 11% BaO, up to about 10% $ZrO_2$, from about 0.05% to about 1.1% $Fe_2O_3$ and from about 0.05% to about 0.95% PbO.

7 Claims, No Drawings

DIELECTRIC MATERIALS

Technical Field

The present invention concerns a new and improved material for use in the construction of electronic circuits. More particularly, the invention concerns a dielectric material suitable for use in conjunction with an aluminum nitride substrate.

BACKGROUND

In the construction of electronic circuits and/or devices, a material of choice in many applications is aluminum nitride. Specifically, in many applications it is desirable to utilize aluminum nitride substrates because aluminum nitride exhibits a low coefficient of thermal expansion and high thermal conductivity as compared to, for example, alumina substrates.

Examples of prior art dielectric materials for use in conjunction with aluminum nitride may be found in Hang et al., U.S. Pat. Nos. 4,808,673 and 4,830,988. U.S. Pat. No. 4,808,673 discloses for example a dielectric ink including a glass composition comprising 15%–25% ZnO, 10%–25% MgO, 3%–12% BaO or SrO. 5%–20% $Al_2O_3$, 35%–50% $SiO_2$, 0.5%–3% $P_2O_5$ and 1%–5% $ZrSiO_4$. U.S. Pat. No. 4,830,988 discloses a dielectric ink including a glass composition comprising 25%–31% MgO, 9%–18% BaO, 10%–18% $Al_2O_3$, 10%–15% $B_2O_3$, 24%–34% $SiO_2$, 0.6%–0.8% $P_2O_5$, 2.5%–4.5% $ZrSiO_4$, 0%–2% $Sb_2O_3$ and 0%–0.3% $CeO_2$.

New dielectric materials are continually being sought which provide improved thermal and dielectric properties, and a better coefficient of thermal expansion (CTE) with AlN substrates over a wide range of temperature (and no change of CTE upon refiring which could result in warpage of the aluminum nitride substrate).

SUMMARY OF THE INVENTION

The present invention provides new and improved dielectric materials. The dielectric materials display good dielectric properties and they may be adherently bonded to aluminum nitride substrates substantially free of bubbles or pores. The dielectric materials are produced at a relatively low firing temperature, thus they are compatible for use with a variety of precious and nonprecious metals.

In a preferred embodiment the novel dielectric material is formed by firing a composition including a glass composition comprising in weight percent from about 22% to about 45% ZnO, from about 4% to about 22% MgO, from about 1% to about 16% $Al_2O_3$, from about 20% to about 49% $SiO_2$, from about 2% to about 11% BaO, up to about 10% $ZrO_2$, from about 0.05% to about 1.1% $Fe_2O_3$ and from about 0.05% to about 0.95% PbO.

DETAILED DESCRIPTION OF PREFERRED EMBODIMENTS

The invention provides new and useful dielectric materials which are adapted for use upon aluminum nitride (AlN) substrates and in conjunction with various types of metallization materials such as gold, silver and silver/palladium. As used herein this specification and the claims below, the terms "AlN substrate" and "aluminum nitride substrate" mean a substrate containing in excess of about 50% by weight aluminum nitride.

In one embodiment of the invention the dielectric material is formed by firing a thick film paste having a glass composition comprising ZnO, MgO, $Al_2O_3$, $SiO_2$, BaO, $Fe_2O_3$, PbO and optionally $ZrO_2$. The glass composition includes from about 22% by weight to about 45% by weight ZnO, preferably from about 24% by weight to about 42% by weight ZnO, and more preferably from about 26% by weight to about 40% by weight ZnO. The glass composition includes from about 4% by weight to about 22% by weight MgO, preferably from about 6% by weight to about 18% by weight MgO, and preferably from about 8% by weight to about 15% by weight MgO. The glass composition includes from about 1% by weight to about 16% by weight $Al_2O_3$, preferably from about 3% by weight to about 13% by weight $Al_2O_3$, and more preferably from about 5% by weight to about 11% by weight $Al_2O_3$. The glass composition includes from about 20% by weight to about 49% by weight $SiO_2$, preferably from about 25% by weight to about 45% by weight $SiO_2$, and more preferably from about 30% by weight to about 40% by weight $SiO_2$. The glass composition includes from about 2% by weight to about 11% by weight BaO, preferably 4% by weight to about 9% by weight BaO, and more preferably from about 5% by weight to about 7% by weight BaO. The glass composition includes up to about 10% by weight $ZrO_2$, preferably up to about 8% by weight $ZrO_2$, and more preferably up to about 7% by weight $ZrO_2$. The glass composition includes from about 0.05% by weight to about 1.1% by weight $Fe_2O_3$, preferably from about 0.10% by weight to about 10.0% by weight $Fe_2O_3$, and more preferably from about 0.15% by weight to about 0.95% by weight $Fe_2O_3$. The glass composition includes from about 0.05% by weight to about 0.95% by weight PbO, preferably from about 0.10% by weight to about 0.80% by weight PbO, and more preferably from about 0.20% by weight to about 0.70% by weight PbO.

The glass compositions of the present invention can be prepared in any conventional manner. For example, a mixture of the appropriate ingredients can be placed in a platinum crucible and melted (e.g., 1450° C.–1550° C.), the resulting glass composition is then poured onto cold steel rolls to form thin flakes suitable for milling. These flakes are then milled to a suitable particle size distribution (e.g., about 0.5 to about 20 microns).

In order to produce a thick film paste the glass compositions are dispersed in a suitable binder or vehicle to form a dielectric paste.

The binder or vehicle is preferably an organic binder or vehicle and is provided in an amount sufficient to disperse the solids in the binder or vehicle and to at least temporarily bond the dielectric composition to a substrate prior to firing. In practice, the solid components, i.e., the glass composition is preferably present in the range of from about 50% to about 95% by weight of the dielectric paste composition and the binder or vehicle is preferably present in an amount ranging from about 3% to about 50% by weight of such dielectric paste composition. In addition to the glass composition and the vehicle, various conventional fillers or expansion modifiers and other glasses may be included. Examples of expansion modifiers include zinc silicates, magnesium silicates, barium aluminum silicates, zirconium silicates, barium magnesium silicates, zirconia, alumina, silica, and titania.

The organic binder or vehicle is usually an organic resin dissolved in a suitable solvent. Any essentially inert binder can be used in the practice of the present invention, including various organic liquids, with or without thickening and/or stabilizing agents and/or other common additives. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethyl cellulose in solvents such as pine oil, the monobutyl either of ethylene glycol monoacetate, and carbinol. The binder can contain volatile liquids to promote fast setting after application to the substrate.

In one embodiment of the invention, the vehicle or binder contains from about 0.1% to about 10% by weight resin and about 90% to about 99.9% by weight solvent or mixture of solvents. The resin can be ethyl cellulose or an acrylate resin (e.g., methyl methacrylate). The solvent can be terpineol, 2,4,4-trimethyl-1,3-pentanediol monoisobutylrate, N-methyl-2-pyrrolidone or mixtures thereof. The vehicle or binder can include a thixotropic material, preferably at a concentration of less than about 0.25% by weight.

The inventive thick film dielectric paste compositions are applied to a substrate such as an AlN base substrate in accordance with the invention using techniques well-known to those skilled in the art. An example of such a technique is silk screening wherein the paste is forced through a fine mesh stainless steel screen in a desired pattern. Typically the size of such a screen varies from about 200 to about 325 mesh. Other examples include spraying, dipping, spinning, brushing and application using a doctor blade.

This invention also relates to a method of bonding the inventive dielectric material to an AlN substrate comprising applying to at least one surface of said substrate the present dielectric paste, heating the substrate in an oxidizing atmosphere (e.g., air) to a temperature sufficient to permit the glass composition contained in the dielectric paste to fuse (e.g., about 750° C. to about 1050° C.), and then cooling the substrate to a temperature sufficient to permit the dielectric material to adhere firmly to the AlN substrate. This invention also relates to an AlN substrate having the inventive dielectric material bonded to at least one surface thereof using the foregoing method.

This invention also relates to the use of the inventive dielectric material in conjunction with metallizations or base metal conductors, such as silver, gold or silver/palladium, to produce a functional electronic circuit on an AlN substrate.

This invention also provides for a multilayered circuit comprising a plurality of layers of interconnected electronic circuitry, each of said layers being separated by the inventive dielectric material.

This invention also provides for a thick-filmed circuit comprising at least one layer of electronic circuitry in contact with a dielectric composition, said dielectric material comprising the inventive dielectric material.

Once the circuit is formed the inventive dielectric pastes are dried and then fired in an oxidizing atmosphere at a peak temperature in the range of from about 750° C. to about 1050° C., preferably from about 800° C. to about 950° C., and more preferably from about 825° C. to about 900° C. Preferably, firing at the peak temperature is maintained for about 8 to about 12 minutes, more preferably about 9 to about 11 minutes. The heat-up time is preferably about 20 to about 26 minutes, more preferably about 22 to about 26 minutes. The cool-down time is preferably about 22 to about 32 minutes, more preferably about 23 to about 29 minutes. The oxidizing atmosphere can be air or any oxygen containing atmosphere. The term "firing" is used herein to mean heating to a temperature and for a time sufficient to volatilize (burnout) all of the organic material in the dielectric paste and to sinter the glass composition.

The invention also relates to tapes or "green tapes" comprising a flexible substrate and the present glass composition adhered to the flexible substrate. These tapes are made by casting a dispersion of the glass composition in the above-discussed organic binder or vehicle onto a flexible substrate, such as a steel belt or polymeric film, and then heating the cast layer to remove the volatile solvent. In this embodiment of the invention, the solvent preferably, has a boiling point below about 150° C. and the heating step used to remove the solvent is conducted at a sufficient temperature to vaporize the solvent. Examples of such solvents include acetone, xylene, methanol, ethanol, isopropanol, methyl ethyl ketone, 1,1,1-trichloroethane, tetrachloroethylene, amyl acetate, 2,2,4-triethyl pentanediol-1,3-monoisobutylrate, toluene, methylene chloride and fluorocarbons. It will be recognized that individual components of the solvent may not be complete solvents for the binder polymer. Yet, when blended with other solvent components, they function as solvents.

The green tape can be used to form a dielectric or insulating material for multilayer electronic circuits. A roll of green tape is blanked with registration holes in each corner to a size somewhat larger than the actual dimensions of the circuit. To connect various layers of the multilayer circuit, via holes are formed in the green tape. This is typically done by mechanical punching. However, a sharply focused laser can be used to volatilize the green tape. Typical via hole sizes range from about 0.006" to about 0.25". The interconnections between layers are formed by filling the via holes with a thick film conductive ink. This ink is usually applied by standard screen printing techniques. Each layer of circuitry is completed by screen printing conductor tracks. Also, resistor inks or high dielectric capacitor inks can be printed on each layer to form resistive or capacitive circuit elements. Also, high dielectric constant green tapes similar to those used in the multilayer capacitor industry can be incorporated as part of the multilayer circuitry.

After each layer of the circuit is completed, the individual layers are stacked and laminated. A confined pressing die is used to insure precise alignment between layers. The laminates are trimmed with a hot stage cutter. Firing can be carried out in a standard thick firm conveyor belt furnace.

In order to further illustrate the invention, the Examples below are provided. Unless otherwise indicated, in the following Example as well as throughout the entire specification and in the appended claims, all parts and percentages are by weight, and all temperatures are in degrees centigrade (° C). While these examples will show one skilled in the art how to operate within the scope of this invention, they are not to serve as a limitation on the scope of the invention for such scope is only defined in the claims below.

Example I

The components listed below in Table I were weighed in accordance with the prescribed mixing ratio into the total amount of a 150 gram batch of paste.

TABLE I

| Materials Used | % by Weight |
| --- | --- |
| Glass Composition A | 70.56 |
| M-39[1] | 1.44 |
| V-438[2] | 2.80 |
| V-437[3] | 22.21 |
| α-Terpineol[4] | 2.04 |
| Sulsperse-3000[5] | 0.95 |
| | 100.00% |

[1]Coloring dye available from Mason Color Works, Inc, of East Liverpool, Ohio, under the trade designation Royal Blue 6339 (39).
[2]Vehicle available from the Ferro Corporation of Cleveland, Ohio, under the trade designation V-438.
[3]Vehicle available from the Ferro Corporation of Cleveland, Ohio, under the trade designation V-437.
[4]Available from Fisher Scientific of Fair Lawn, New Jersey.
[5]Sulsperse 3000 available from ICI Americas Inc. of Wilmington, Delaware.

The composition of the Glass Composition A is shown below in Table II.

TABLE II

| Oxide | % by Weight |
| --- | --- |
| $SiO_2$ | 37.48 |
| ZnO | 36.64 |
| MgO | 10.56 |
| $Al_2O_3$ | 8.86 |
| BaO | 5.54 |
| $Fe_2O_3$ | 0.56 |
| PbO | 0.36 |

The paste of Table I was printed onto an AlN substrate using conventional screen printing techniques. The paste of Table I was also screen printed onto AlN substrates that had been metalized with gold. All the coated substrates were dried in air at 110° C. for a period of 7 minutes. The dried substrates were then fired in a belt furnace having an oxidizing atmosphere at 850° C. for a period of 45 minutes with 10 minutes at the peak temperature.

Example II

The components listed below in Table I were weighed in accordance with the prescribed mixing ratio into the total amount of a 150 gram batch of paste.

TABLE I

| Materials Used | % by Weight |
| --- | --- |
| Glass Composition B | 69.79 |
| Zinc Silicate | 0.71 |
| M-6266[1] | 2.00 |
| V-438[2] | 2.75 |
| V-437[3] | 22.00 |
| α-Terpineol[4] | 2.75 |
| | 100.00% |

[1]Coloring dye available from Mason Color Works, Inc. of East Liverpool, Ohio, under the trade designation Peacock Green 6266 (668).
[2]Vehicle available from the Ferro Corporation of Cleveland, Ohio, under the trade designation V-438.
[3]Vehicle available from the Ferro Corporation of Cleveland, Ohio, under the trade designation V-437.
[4]Available from Fisher Scientific of Fair Lawn, New Jersey.

The composition of the Glass Composition B is shown below in Table II.

TABLE II

| Oxide | % by Weight |
| --- | --- |
| $SiO_2$ | 38.98 |
| ZnO | 31.05 |
| MgO | 14.04 |
| $Al_2O_3$ | 9.20 |
| BaO | 5.77 |
| $Fe_2O_3$ | 0.58 |
| PbO | 0.38 |

The paste of Table I was printed onto an AlN substrate using conventional screen printing techniques. The paste of Table I was also screen printed onto AlN substrates that had been metalized with gold. All the coated substrates were dried in air at 110° C. for a period of 7 minutes. The dried substrates were then fired in a belt furnace having an oxidizing atmosphere at 850° C. for a period of 45 minutes with 10 minutes at the peak temperature.

Other features and aspects of the invention will be appreciated by those skilled in the art upon reading and comprehending this disclosure. Such features, aspects and variations and modifications are clearly within the scope of this invention and this invention is limited solely by the scope of the following claims.

What is claimed:

1. An electronic thick film paste for use in producing a dielectric material which is suitable for use in conjunction with an aluminum nitride substrate, said paste comprising from about 50% by weight to about 95% by weight of a glass composition and from about 3% by weight to about 50% by weight of a vehicle, said glass composition comprising in weight percent from about 22% to about 45% ZnO, from about 4% to about 22% MgO, from about 1% to about 16% $Al_2O_3$, from about 20% to about 49% $SiO_2$, from about 2% to about 11% BaO, up to about 10% $ZrO_2$, from about 0.05% to about 1.1% $Fe_2O_3$ and from about 0.05% to about 0.95% PbO.

2. A thick film paste as set forth in claim 1 wherein said glass composition comprises in weight percent from about 24% to about 42% ZnO, 6% to about 18% MgO, from about 3% to about 13% $Al_2O_3$, from about 25% to about 45% $SiO_2$, from about 4% to about 9% BaO, up to about 8% $ZrO_2$, from about 0.1% to about 0.95% $Fe_2O_3$ and from about 0.10% to about 0.80% PbO.

3. A thick film paste as set forth in claim 1 wherein said glass composition comprises in weight percent from about 26% to about 40% ZnO, from about 8% to about 15% MgO, from about 5% to about 11% $Al_2O_3$, from about 30% to about 40% $SiO_2$, from about 5% to about 7% BaO, up to about 7% $ZrO_2$, from about 0.15% to about 0.95% $Fe_2O_3$ and from about 0.20% to about 0.70% PbO.

4. A thick film paste as set forth in claim 1 wherein said vehicle comprises an organic resin dissolved in a solvent.

5. A thick film paste as set forth in claim 1 wherein said vehicle comprises an aliphatic alcohol.

6. A thick film paste as set forth in claim 1 wherein said vehicle comprises a terpineol.

7. A thick film paste as set forth in claim 2 wherein said vehicle comprises a resin selected from the group consisting of ethyl cellulose and an acrylate resin and mixtures thereof.

* * * * *